(12) United States Patent
Chen et al.

(10) Patent No.: US 11,767,670 B2
(45) Date of Patent: Sep. 26, 2023

(54) METHOD FOR PRODUCING A HEAT INSULATING MATERIAL COMPOSED OF A HYDROPHOBIC AEROGEL AND THE APPLICATION THEREOF

(71) Applicant: Taiwan Aerogel Technology Material Co., Ltd., Tainan (TW)

(72) Inventors: Jean-Hong Chen, Tainan (TW); Shiu-Shiu Chen, Tainan (TW); Sheng-Hong Pong, Tainan (TW)

(73) Assignee: TAIWAN AEROGEL TECHNOLOGY MATERIAL CO., LTD., Tainan (TW)

( * ) Notice: Subject to any disclaimer, the term of this patent is extended or adjusted under 35 U.S.C. 154(b) by 356 days.

(21) Appl. No.: 16/860,619

(22) Filed: Apr. 28, 2020

(65) Prior Publication Data

US 2021/0332586 A1 Oct. 28, 2021

(51) Int. Cl.
| | | |
|---|---|---|
| *E04B 1/78* | (2006.01) | |
| *C01B 33/157* | (2006.01) | |
| *C01B 33/158* | (2006.01) | |
| *B01J 13/00* | (2006.01) | |

(52) U.S. Cl.
CPC .............. *E04B 1/78* (2013.01); *B01J 13/0056* (2013.01); *B01J 13/0065* (2013.01); *B01J 13/0069* (2013.01); *B01J 13/0091* (2013.01); *C01B 33/157* (2013.01); *C01B 33/1585* (2013.01)

(58) Field of Classification Search
CPC .................................................. C01B 33/1585
See application file for complete search history.

(56) References Cited

U.S. PATENT DOCUMENTS

| | | | | |
|---|---|---|---|---|
| 5,122,291 A | * | 6/1992 | Wolff | C04B 14/064 516/111 |
| 2007/0272902 A1 | * | 11/2007 | Evans | B01J 13/0091 252/600 |
| 2014/0076070 A1 | * | 3/2014 | Nakanishi | B01J 20/28085 521/154 |
| 2017/0283269 A1 | * | 10/2017 | Kotake | C01B 33/1585 |

FOREIGN PATENT DOCUMENTS

| | | | | |
|---|---|---|---|---|
| CN | 101679657 B | * | 11/2012 | .......... A61K 8/0279 |
| CN | 104556969 A | * | 4/2015 | |
| CN | 109987960 A | * | 7/2019 | |
| JP | 2015048417 A | * | 3/2015 | |

OTHER PUBLICATIONS

Machine Translation of CN109987960A. Jul. 9, 2019. (Year: 2019).*
Functional Groups. Organic Chemistry I. Pressbooks. https://kpu.pressbooks.pub/organicchemistry/chapter/2-3-functional-groups/. As viewed on Mar. 23, 2023. (Year: 2023).*
Li et al. Preparation of Cu—SiO2 composite aerogel by ambient drying and the influence of synthesizing conditions on the structure of the aerogel. Chinese Science Bulletin, 2011, 56(7), 685-690. (Year: 2011).*
Tang et al. Fabrication and characterization of composition-gradient CuO/SiO2 composite aerogel. J. Sol-Gel Sci. Technol. 2013, 68, 102-109. (Year: 2013).*
Wang, et al. Visible light photocatalytic activities of transition metal oxide/silica aerogels. Microporous and Mesoporous Materials, 2004, 73, 143-147. (Year: 2004).*
Amiri et al. Cogeled copperesilica aerogel as a catalyst in hydrogen production from methanol steam reforming. International Journal of Hydrogen Energy, 2015, 40, 1472-1480. (Year: 2015).*
Xu et al. Template confined synthesis of Cu- or Cu2O-doped SiO2 aerogels from Cu(II)-containing composites by in situ alcohothermal reduction. RSC Adv. 2014, 4, 49541. (Year: 2014).*

* cited by examiner

*Primary Examiner* — Stephen E Rieth
(74) *Attorney, Agent, or Firm* — Locke Lord LLP; Tim Tingkang Xia, Esq.

(57) ABSTRACT

The invention provides a method for producing a heat insulating material composed of a hydrophobic aerogel, and the method includes the steps of: (1) mixing step; (2) hydrolysis step; (3) condensation step; (4) aging step; and (5) drying step. In the method, a siloxane compound, an inorganic gel, and a halogen-free surfactant are mixed and then a sol-gel process is performed to produce the aerogel heat-insulating material without water-washing. The produced heat-insulating material has preferable strength, smooth appearance, and low shrinkage and can overcome the powder-dropping problem. By the provided method, an aerogel heat-insulating board can be produced, or an aerogel cold-resisting and heat-insulating blanket can be produced by mixing with a fiber or a foam material.

15 Claims, 8 Drawing Sheets

HEAT INSULATING MATERIAL COMPOSED OF INORGANIC BINDER AND AEROGEL

HEAT INSULATING BLANKET COMPOSED OF INORGANIC BINDER, HYDROPHOBIC AEROGEL AND INORGANIC FIBER

METHOD FOR PRODUCING A HEAT INSULATING MATERIAL COMPOSED OF A HYDROPHOBIC AEROGEL AND THE APPLICATION THEREOF

FIELD OF THE INVENTION

The present invention relates to a method for producing a heat insulating material composed of a hydrophobic aerogel, and particularly to a quick production method for a heat insulating material composed of a hydrophobic aerogel having the properties of low temperature heat insulating and water repellent.

BACKGROUND OF THE INVENTION

Aerogel refers to a porous high-tech material having a geometrical network structure, and it has the characteristics of low density (0.003 to 0.2 g/cm$^3$), high specific area (500-2,000 m$^2$/g) and low thermal conductivity (0.02 to 0.036 w/mK). The porosity of aerogel reaches above 95% and its internal contains a great amount of air; therefore, it has an overall transparent appearance and the characteristics of low thermal conductivity coefficient, low acoustic transmission speed and low dielectric constant, making aerogel as a material with the properties of excellent heat insulation, soundproof, electrical insulation, high absorbing and high filtering material. Nevertheless, to achieve the foregoing functions during actual use, it is necessary to uniformly distribute the aerogel powder onto a substrate of rockwool, glass fiber or carbon fiber in order to form an aerogel heat insulation blanket. However, presently available aerogel heat insulating blankets are subject to the problem of loose powder, and under the repetitive use between the temperature interval of −200° C. and 200° C., water molecules near the freezing point (0° C.) are able to infiltrate into the blanket, causing the pipes installed inside the heat insulating blanket to generate rust. In addition, such water molecules also form ice under the freezing point condition, causing damages to the structure of the heat insulating blanket. In addition, common aerogel heat insulating blankets typically use a conventional organic binding agent to bond with the aerogel powder. Consequently, under the high temperature of 300° C., the organic binding agent starts to degrade and release a great amount of toxic gas and odor. Such occurrence is likely cause corrosion of the pipes laid inside the heat insulating blanket or cause damages to operating personnel or pollution to the environment. Furthermore, when the aerogel heat insulating blanket generates obvious degradation, its heat insulation effect is significantly reduced.

The inventor uses the method for producing a hydrophobic aerogel as a basis for the sol-gen synthesis. First, it mainly mixes the precursor of alkoxysilane (such as, methyltrimethoxysilane (MTMS) or methyltriethoxysilane (MTES)) with an organic solvent, followed by the addition of an acid catalyst to perform the hydrolysis. For a certain hydrolysis period, a basic catalyst is added to perform the condensation reaction, and the mixing solution gradually forms into sol during the condensation process. Next, the solvent of n-butanol, n-hexanol, n-hexane or cyclohexane is used to perform the solvent replacement on the sol. In addition, once the solvent replacement is complete, drying is performed under normal temperature and normal pressure or under high temperature and normal pressure. Alternatively, for the hydrophobic aerogel, the precursor of alkoxysilane (such as, tetraethoxysilane (TEOS) or (tetramethoxysilane (TMOS)) can also be mixed with an organic solvent, followed by the addition of an acid catalyst to perform the hydrolysis. For a certain hydrolysis period, a basic catalyst is added to perform the condensation, and it is able to gradually form a geometrical network structure of a stable structure during the condensation process. Finally, the solvent of n-butanol, n-hexanol, n-hexane or cyclohexane is used to perform the solvent replacement on the network structure, following which the hydrophobic modifier of trimethyl chlorosilane or hydrophobic alkoxysilane is further used to perform the hydrophobic modification in order to allow the hydrophobic functional group structure to form chemical bonding with the geometrical network structure. At the end, the normal pressure drying technique is applied to dry off the solvent in the structure in order obtain a dry porous aerogel block.

The method for producing hydrophobic aerogel can also use olefin alkoxysilane compound (such as: methyltrimethoxysilane (MTMS) or methyltriethoxysilane (MTES)) mix with water to become a transparent solution. After hydrolysis for a time period, a basic catalyst is added therein to perform condensation reaction directly under the environment of a pH value of 11.0, and it then gradually forms gel during the condensation process. Next, aqueous solution of 70 to 80° C. is used to perform aging for 20 to 24 hours. Finally, the drying under normal temperature and normal pressure or under high temperature and normal pressure is used to obtain a hydrophobic aerogel block. During the production process, the content of the olefin alkoxysilane is approximately 16% to 20%, and the hydrophobic polysilsesquioxane aerogel has the contact angle of 165 to 175 degree, the density of 0.07 to 0.12 g/cm$^3$, the porosity of 92 to 96%, and the pore diameter distribution of 120 to 1200 nm. In addition, the aerogel structure obtained is relatively fluffy, and is prone to generate loose powder and fracture; therefore, its application is limited.

U.S. Patent Application No. US20140076070A1 discloses a monolithic silicone and method of separation, purification, and concentration therefor. The monolithic silicone contains soft aerogel or Xerogel, and it can be a monolithic silicone gel of soluble substance molecules. Such type of monolithic silicone gel uses a bifunctional alkoxysilane and a trifunctional alkoxysilane as the starting materials for copolymerizing while causing phase separation in order to form Si—O network structure with continuous channels. In addition, such type of monolithic silicone gel comprises a silicone network skeleton of a continuous network structure formed by the aggregation of aerogel or Xerogel, and the continuous pore diameter of 1 to 50 μm, silicon skeleton diameter of 1 to 30 μm. However, despite that such type of aerogel network structure is great but its strength is relatively week. In addition, its preparation time requires a long time period of washing replacement, such that it is not economic effective.

Chinese Invention Patent Publication No. CN101679657B discloses aerogel particles and manufacturing method thereof. The hydrophobic aerogel particles obtained have the following characteristics of: (1) containing silicone particles; (2) at least 80% with a particle size smaller than 1 micrometer; and (3) average particle size of 0.1 micrometer to 1 micrometer. The posterior part of the method for manufacturing the aerogel particles require homogenization or wet grinding. Surface treatment can be performed on the starting aerogel particles during the homogenization or wet grinding to prevent coagulation or aggregation. During the production of the hydrophobic aerogel particles, it is necessary to utilize grinding process to homogenize or wet grind the aerogel, such that the process cannot be operated easily and is not cost effective.

Chinese Invention Patent Publication No. CN104556969A discloses a method for producing hydrophobic silicon dioxide aerogel heat insulating composite material, and it specifically comprises the following steps: (1) preparation of silicone dioxide sol: using the precursor of siloxane, and adding an organic solvent, water and an acid catalyst therein in order to obtain silicon dioxide sol; (2) preparation of composite gel: adding a flame retardant, an infrared blocker into the silicon dioxide sol and mixing it uniformly, followed by adding a basic catalyst and then immersing the inorganic fiber product into the silicon dioxide sol for placing therein stationary; (3) solvent replacement: using an organic solvent to replace the composite gel; (4) drying: performing drying on the composite gel. In such production process, it is necessary to use organic solvent replacement step and aging of the composite gel for more than ten hours, such that the overall production time is long and is not economic effective.

Japanese Invention Patent Publication No. JP200835648 discloses a porous material and a preparation method thereof. It mainly mixes a siloxane compound (such as, TEOS) or a silicate compound (such as: sodium silicate) with an organic solvent and uses the sol-gel for synthesis, followed by using a modifier for modification in order to obtain the porous material. Accordingly, the hydrophilic functional group on the surface of the porous structure material is replaced with the hydrophobic functional group, in order to prevent the rupture of the aerogel due to the water surface tension; consequently, it can be dried under room temperature and normal pressure. In such production process, it is necessary to use organic structure to perform functional group replacement, such that the overall production time is long and is not economic effective.

Japanese Invention Patent Publication No. 201548417 discloses a method for producing a polysiloxane porous structure with ultra water repellent property, and it is mainly to overcome the problem of diminishing of the water repellent property after the soft polysiloxane porous structure contacts with an object. During the production process, it uses a conjugate (such as bi-silicone compound and tri-silicone compound) formed by the bifunctional silicone compound and multifunctional silicone compound, and uses the sol-gel method in the solution system to add silicone compound in order to perform hydrolysis and condensation as well as phase separation of the system in order to obtain polysiloxane of a contact angle of 150 degree, and the silicon skeleton diameter is 1 to 3 μm.

The foregoing method for producing the hydrophobic aerogel material generally requires numerous times of solvent replacement and the use of organic substance to perform the hydrophobic modification, the cost of the process is high and the time required is long such that it is not cost effective.

SUMMARY OF THE INVENTION

An objective of the present invention is to overcome the problem of existing production process using solvent replacement or washing condition such that it is not cost effective due to its overly high cost and overly time-consuming process. To be more specific, the present invention only requires the steps of hydrolysis and condensation reaction during the silicone aerogel material production process, and in particular, to block or board production process, following which once aging is performed under high temperature, drying can then be performed under normal pressure and normal temperature. Consequently, the entire process does not require the step of solvent replacement or washing to obtain the aerogel product. As a result, the process is simple and economic effective.

Another objective of the present invention is to overcome the drawbacks of a currently existing aerogel heat insulating blanket that is prone to generate loose powder. In particular, a known aerogel heat insulating blanket mainly uses aerogel powder and inorganic fiber or organic fiber intertwined with each other; therefore, the structure is fluffy, and the aerogel cannot be bonded tightly with the inorganic fiber or the organic fiber, such that it is extremely likely to generate loose powder during use. Despite that a portion of hydrophobic aerogel heat insulating blanket uses organic adhesive or oil for spraying onto the heat insulating blanket during the production process in order to prevent the occurrence of loose powder; nonetheless, under a temperature above 150° C., the oil and the organic adhesive inside the heat insulating blanket starts to gasify or undergo thermal degradation. Consequently, large amount of odor or smoke is generated.

Still another objective of the present invention is to add an inorganic binder solution during the production process of the aerogel in order to achieve a greater binding force among the aerogel skeleton. Consequently, the aerogel produced is of appropriate strength and flexibility, the product surface is smooth without loose powder, and during the drying process, the structure has nearly no contraction. As a result, there is no need to adopt the expensive supercritical drying technique to obtain a hydrophobic aerogel block or board.

Still another objective of the present invention is not to add a surfactant containing chloride ions during the production process of the aerogel. Consequently, after the aging of the aerogel produced, drying can be performed directly without the need for a long time period of washing and replacement. In addition, when the aerogel produced is used under a temperature higher than 100° C., it does not generate any odor or release any toxic substance; therefore, the entire process is simple, highly economic effective and products are of high safety.

Still another objective of the present invention is to combine inorganic fiber, organic fiber or foam material during the production process of the aerogel in order to obtain products of a heat insulating board or heat insulating blanket composed of hydrophobic and high heat insulating aerogel. During such process, a small amount of inorganic binder solution is added in order to achieve binding between the aerogel and inorganic fiber, organic fiber or foam material. Consequently, during the subsequent use of the aerogel blanket produced, there is nearly no loose powder.

Still a further objective of the present invention is to obtain an aerogel condensation solution from the production process such that it is capable of being directly sprayed, pressed or coated onto a conventional inorganic fiber fabric or inorganic fiber blanket (such as: glass fiber, ceramic fiber, rockwool fiber and carbon fiber) for binding therewith, in order to obtain a water repellent aerogel heat insulating blanket that is soft, heat insulating and flameproof property, in order to be used for heat insulating and cold resisting functional fabric or applied to indoor and outdoor heat insulation.

Accordingly, the present invention provides a simple method for producing a heat insulating material composed of a hydrophobic aerogel, and such method comprises the following steps of: (1) mixing step: adding a siloxane compound, a small amount of inorganic binder solution and a small amount of halogen-ion-free surfactant into a mixing solvent in order to allow them to be dispersed in the mixing solvent to form a uniform mixing solution; (2) hydrolysis step: adding an acid catalyst into the mixing solution to perform a hydrolysis reaction; (3) condensation step: adding a basic catalyst into the hydrolyzed mixing solution to perform a condensation reaction, wherein during the condensation reaction process, wherein the siloxane compound forms stable hydrogel initial particles of a particle size of 5 to 10 nanometers, followed by binding with each other to grow into hydrogel secondary particles of 100 to 1,000 nanometers, in order to increase the viscosity of the mixing solution and to form a solution-like sol; finally, the hydrogel secondary particles form a wet gel of a network structure; (4) aging step: performing aging on the wet gel of a network structure under a specific temperature range in order to form a more stable gel structure; and (5) drying step: performing evaporation and drying on the gel structure under normal pressure to remove aqueous solvent, wherein the drying step is performed by using an environment of approximately 50-90° C. in order to allow water molecules in the gel structure to escape slowly first, followed by performing quick drying under a high temperature of 90-150° C., in order to obtain an insulating material composed of a hydrophobic aerogel.

Furthermore, in the condensation step, when the mixing solution becomes the solution-like sol, the solution-like sol is filled or immersed into an inorganic fiber blanket, an organic fiber blanket or an organic foam material quickly, allowing the solution-like sol to fill the inorganic fiber blanket, the organic fiber blanket or the organic foam material, followed by stationary placing the inorganic fiber blanket, the organic fiber blanket or the organic foam material filled with the solution-like sol, allowing hydrogel secondary particles in the solution-like sol to condense gradually in the inorganic fiber blanket, the organic fiber blanket or the organic foam material in order to form the wet gel.

Furthermore, the siloxane compound comprises one a plurality of compounds selected from a group consisting of the following: alkoxysilane compound, olefin alkoxysilane compound and R-silicone oligo molecules; wherein the alkoxysilane compound refers to, such as: tetramethoxysilane (TMOS) or tetraethoxysilane (TEOS); the above molecule described in this content is mainly to provide the aerogel fishnet structure bonding point density in order to enhance the aerogel structural strength. The olefin alkoxysilane compound refers to, such as: methyltrimethoxysilane (MTMS) or methyltriethoxysilane (MTES); the above molecules described in this content is mainly to provide the aerogel hydrophobic property in order to increase the softness and to increase the environmental stability for the aerogel structure. The R-silicone oligo molecules refer to, such as: polydimethylsiloxane (PDMS) or silicone precursor (DMDMS); the above molecules described in this content is mainly to provide the aerogel elasticity and softness in order to increase the environmental stability of the aerogel structure, and the R— is linked to a functional group at a silicone molecular chain rear end, and such functional group can be used to perform optimal binding with other fiber substrate.

Furthermore, the mixing solvent comprises one or a plurality of substances selected from a group consisting of the following: water and alcohols.

Furthermore, the inorganic binder solution provides the acid ion necessary for the hydrolysis process, and it also provides the bonding strength among silicone molecules, such that the network skeleton structure of the wet gel can have a greater bonding strength during the condensation and aging process, thereby increasing the strength, surface smoothness of the aerogel product, and overcome the problem of loose powder of aerogel.

Furthermore, the acid catalyst used in the hydrolysis comprises one or a plurality of compositions selected from a group consisting of the following: sulfuric acid, phosphoric acid, nitric acid, and boric acid.

Furthermore, the halogen-ion-free surfactant is a chloride-ion free surfactant and comprises one or a plurality of compositions selected from a group consisting of the following: cationic surfactant, anionic surfactant, zwitterionic surfactant and nonionic surfactant.

Furthermore, the basic catalyst used in the condensation comprises one or a plurality of compositions selected from a group consisting of the following: sodium hydroxide, potassium hydroxide, sodium bicarbonate and sodium dihydrogen carbonate.

Furthermore, the basic catalyst solution used in condensation can be an aqueous solution or a mixing solution (such as: one of or a mixture of a plurality of water, secondary water, alcohols, and alkanes) comprising hydrophilic solvent and hydrophobic solvent mixed together according to the process needs. The speed of the hydrogel initial molecules in the mixing solution aggregating to form the secondary particles can be adjusted and the network skeleton structure size of the wet gel can be controlled by the basic catalyst solution. To be more specific, the mixing ratio between the hydrophilic solvent and the hydrophobic solvent can be used to control the interaction between the basic catalyst solution and the siloxane compound molecules, thereby controlling the microphase separation of the gelation behavior of the siloxane compound molecules during the aggregation and bonding process. Consequently, the molecular particle size and pore distribution characteristics of the wet gel structure formed can be controlled.

Furthermore, during the aging step, a high temperature aging device of 70 to 90° C. is used to perform the aging process of the aerogel wet gel. With the high temperature of 70 to 90° C., the portion in the wet gel structure not yet forming the network structure is aged. In general, as the temperature is higher, the wet gel aging speed is faster. In this content, the wet gel aging efficiency can be increased to approximately 30 to 70%.

Furthermore, this method uses a conventional method under normal temperature and normal pressure or under high temperature and normal pressure to perform the drying of the hydrophobic aerogel. After drying, it is able to obtain an aerogel material with the properties of water repellent and heat insulation. In general, in this method, it involves no washing step, and the process is simple such that the entire production process time can be fast and can be shorted to 8 to 24 hours in order to produce dried hydrophobic aerogel board or block, thereby increasing the production efficiency.

Furthermore, in this technique, the silicon condensation solution needs to be combined with the medium of an inorganic fiber blanket, organic fiber non-woven blanket or organic foam material in order to produce the aerogel heat insulating blanket. During the condensation step, when a small amount of inorganic binder solution is further added, the solution system is able to form a composite solution composed of the aerogel and inorganic binder, following which relevant solution can be directly filled into the inorganic fiber blanket, organic fiber non-woven blanket or organic foaming material medium. Next, once aging is performed, drying under normal pressure can be performed in order to produce the application product of an aerogel heat insulating blanket or to produce highly water repellent composite board composed of aerogel and inorganic fiber.

Furthermore, the inorganic binder comprises one or a plurality of compounds selected from a group consisting of the following: phosphate, silicate, sulfate, borate, and metal oxide. To be more specific, the phosphate refers to, such as: zirconium phosphate or phosphoric acid-cooper oxide. The silicate refers to, such as: aluminum silicate or sodium silicate. The metal oxide refers to, such as: an oxide containing metal element of copper, aluminum or zirconium.

Furthermore, the inorganic fiber blanket can be one or a plurality of materials selected from a group consisting of the following: ceramic fiber, glass fiber, carbon fiber, oxidized fiber and rockwool fiber.

Furthermore, the organic fiber blanket or the organic foam material comprises one or a plurality of materials selected from a group consisting of the following: polypropylene, polyester, polyamide, polyamide-ester, polyurethane, polyurea and melamine.

The present invention is of the following technical effects:

1. The hydrophobic aerogel material produced according to the method of the present invention uses an inorganic binder solution in the hydrolysis to provide the acid ions for the hydrolysis system, thereby increasing the hydrolysis speed. Furthermore, the inorganic binder molecules added are able to mix with the hydrogel particles, and are able to jointly condense together with the hydrogel particles during the condensation process in order to form a network skeleton structure. In addition, the inorganic binder molecules are distributed on the surface of the network skeleton structure to form an inorganic binder protective film. Accordingly, the inorganic binder protective film is able to not only provide an appropriate strength for the hydrophobic aerogel material subsequently produced but also increase its temperature of heat resistance, thereby enhancing the application value of the hydrophobic aerogel material.

2. For the hydrophobic aerogel material obtained from the production method of the present invention, the density, particle size, porosity and pore size of the aerogel particles can be controlled based on the production criterion (such as: the type or content of the alkoxysilane compound, the type or content of the olefin alkoxysilane compound, the type and content of the R-silicon oligo molecules, the type or content of the solvent, type or content of the inorganic binder, the type or content of the surfactant, the type or content of the acid catalyst or the basic catalyst, and mixing speed).

3. The production method of the present invention adds a small amount of inorganic binder molecules to mix with the siloxane compound in order to allow the inorganic binder molecules to mix with the siloxane compound molecules and to form a network skeleton structure. Subsequently during the drying and removal of water content, due to the bonding of the siloxane compound molecules with the inorganic binder molecules in the network skeleton structure, the network skeleton structure is stable. Consequently, the structure of the aerogel material and its outer dimension remain nearly the same after drying. Accordingly, the hydrophobic aerogel board and block produced from the method of the present invention is of higher stability.

4. The method of the present invention does not require the use of large amount of solvent to perform solvent replacement, or does not require the use of large amount of water to perform the washing step. Therefore, the entire process is simple, and it is able to significantly reduce the overall production time of the aerogel, thereby increasing the production efficiency.

5. The solution-like sol containing the inorganic binder produced from the method of the present invention can be directly combined with an inorganic fiber blanket, an organic fiber blanket or an organic foam material, such as through the processing technique of immersing, pressing or extrusion and filling in order to allow the solution-like sol to be directly filled into the fiber blanket or the foam material, followed by performing drying under normal pressure in order to produce a heat insulating blanket composed of aerogel and inorganic fiber, a blanket composed of aerogel/organic fiber or a foam pad composed of aerogel and organic fiber.

6. The comparison between the method of the present invention and the method of the prior art indicates the omission of the washing and replacement step, and the overall production time is reduced by 50%. In the method of the present invention, with the addition of the inorganic binder and the surfactant, the strength of the aerogel is enhanced; therefore, the aerogel board or heat insulating blanket produced has an appropriate strength and flexibility, and the overall structural surface is smooth without loose powder. The product developed from the method of the present invention is able to withstand a temperature range of −300 to 350° C., and it is of the properties of resistance to low temperature and high heat insulation. Furthermore, the product developed from the method of the present invention is able to withstand a load reaching above 3 kg when the product weight is 3.3 g. In addition, the thermal conductivity is approximately 0.02 to 0.036 W/mK.

DETAILED DESCRIPTION OF THE INVENTION

Figure 1:
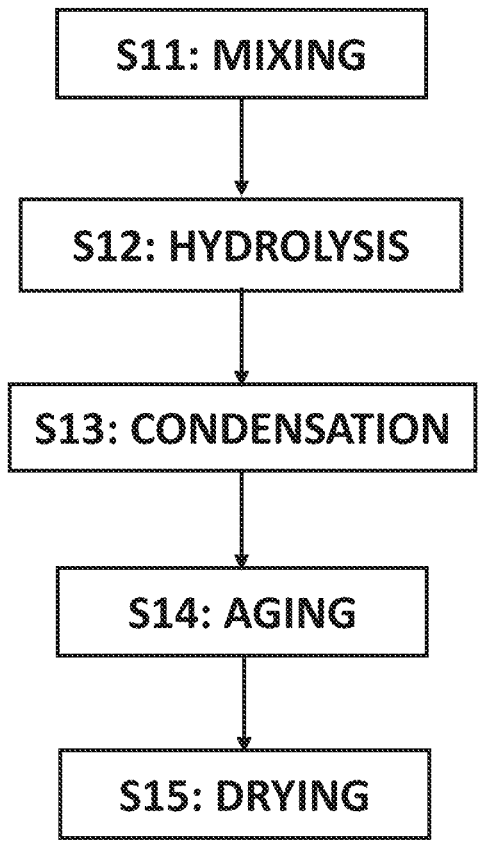
FIG. 1 is a flowchart of the method for producing a low temperature and heat insulating material composed of a hydrophobic aerogel according to a first embodiment of the present invention.

Please refer to FIG. 1, a method for producing a heat insulating material composed of an inorganic binder and aerogel according to a first embodiment of the present invention is shown, comprising the following steps of: mixing step (S11), hydrolysis step (S12), condensation step (S13), aging step (S14), and drying step (S15), thereby to produce a heat insulating board or brick composed of a hydrophobic aerogel, the board or brick having the properties of high strength, without loose powder, resistant to low temperature and cold resisting.

Mixing step (S11): mixing one or a plurality of an alkoxysilane compound, an olefin alkoxysilane compound and R group-silicone oligo molecules or any mixture thereof with a small amount of inorganic binder solution, a small amount of halogen-ion-free surfactant and a mixing solvent together to form a mixing solution. The alkoxysilane compound is, such as, tetramethoxysilane (TMOS) or tetraethoxysilane (TEOS); the olefin alkoxysilane compound is, such as, methyltrimethoxysilane (MTMS) or methyltriethoxysilane (MTES); the R-silicone oligo molecules refer to, such as, polydimethylsiloxane (PDMS) or silicone precursor (DMDMS); wherein the R— is a functional group linked to a silicone molecular chain rear end, and comprises: —COOH, —NH$_2$, —OH, —COH—COH, —N═C═O; and carbon number thereof is from C1 to C6. For calculation based on the total content of the mixing solution, the total content of alkoxysilane compound, olefin alkoxysilane compound and R-silicon oligo molecules is 3.0 mol % to 40.0 mol %, and the total content of the mixing solvent, inorganic binder solution and halogen-ion-free surfactant is 97.0 mol % to 60.0 mol %.

The mixing solvent used in the mixing step (S11) comprises one or a plurality of substances selected from a group consisting of the following: water, conditioned water, deionized water, alcohols, aromatics, and alkanes. To be more specific, the alcohols can be, such as, ethanol; the aromatics can be, such as, toluene; the alkanes can be, such as, n-hexane or cyclohexane; the surfactant can be, such as, hexadecyl trimethyl ammonium halide. In the mixing step (S11), the alkoxysilane compound, olefin alkoxysilane compound or R-silicone oligo molecules is able to mix with the inorganic binder molecules. In addition, since the inorganic binder molecules is a metal oxide, the inorganic binder molecules in the mixing solution is able to dissociate into metal ions and acid ions or basic ions in the mixing solution. Furthermore, based on calculation of a total volume of the mixing solution, a concentration of the inorganic binder solution is 0.05 to 3.0 vol %.

In the mixing solution, the purpose of containing the surfactant is to reduce the phase separation behavior of the mixing solution. The surfactant comprises one or a plurality of compositions selected from a group consisting of the following: cationic surfactant, anionic surfactant, zwitterionic surfactant and nonionic surfactant. Moreover, based on calculation of a total volume of the mixing solution, a concentration of the surfactant is 0.01 to 0.5 vol %.

Hydrolysis step (S12): adding an acid catalyst into the mixing solution to perform a hydrolysis reaction. In addition, the content ratio of the acid catalyst relative to the acid ions generated from the dissociation of the inorganic binder and the total of the alkoxysilane compound, olefin alkoxysilane compound and the R-silicon oligo molecules is 0.0001:1 to 0.01:1. In addition, as the concentration of the acid ions is higher, the hydrolysis efficiency is higher. Nevertheless, the ion concentration can affect the dielectric property of the end product.

Condensation (S13): adding a basic catalyst into the mixing solution after hydrolysis in order to perform the condensation reaction. The basic catalyst solution used in the condensation step (S13) can be an aqueous solution or a mixing solution (such as: one of or a mixture of a plurality of water, secondary water, alcohols, aromatics, and alkanes) comprising hydrophilic solvent and hydrophobic solvent mixed together according to the process needs. The basic catalyst is able to promote the mixing solution to gradually generate phase separation and condensation. During the condensation process, the siloxane compound molecules and the inorganic binder molecules can undergo phase separation in the solution environment. The phase separation can cause the siloxane compound molecules and inorganic binder molecules to aggregate with each other to form aerogel initial particles of a particle size of several nanometers, following which the aerogel initial molecules of several nanometers then further stack and fuse with each other to form aerogel secondary particles of several hundred nanometers. Under such condition, the solution viscosity gradually increases to form a solution-like sol. Next, after such solution-like sol is then filled into different containers, it is placed stationary to allow the solution-like sol to condense again to form a wet gel structure.

Aging step (S14): performing aging on the wet gel formed in the condensation step (S13) under a specific temperature in order to promote the wet gel structure to be more stable. For example, the aging temperature is, such as from 50° C. to 95° C., and preferably from 70° C. to 90° C.

Drying step (S15): after high-temperature distillation is used to remove the remaining liquid in the wet gel structure or filter is used to remove the remaining liquid, quick drying can be performed under the condition of temperature between 90 and 150° C. and under normal pressure, in order to obtain hydrophobic aerogel heat insulating material. Furthermore, a fluidized bed dryer, a constant temperature oven, a drum dryer, a mixing dryer, or a vacuum dryer at a temperature between 90 and 250° C. can be used to perform drying in order to accelerate the drying speed.

Figure 2:
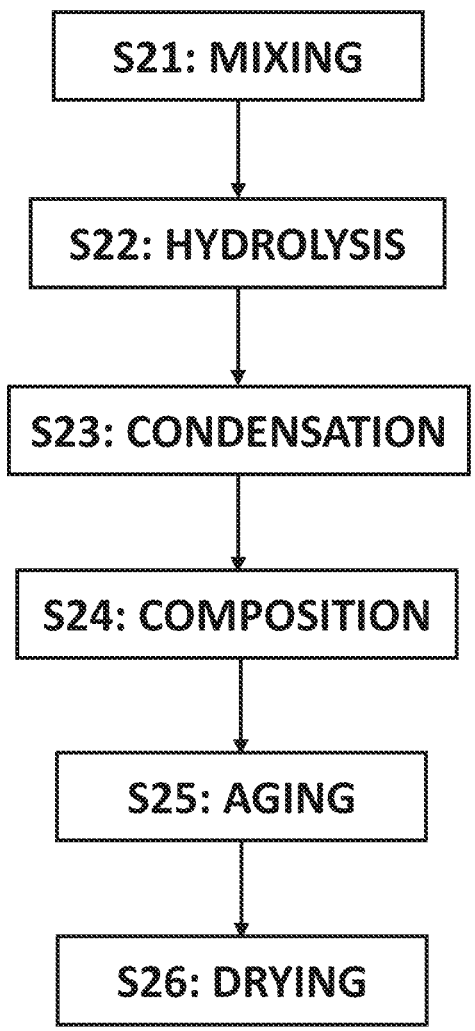
FIG. 2 is a flowchart of the method for producing a low temperature and heat insulating material composed of a hydrophobic aerogel according to a second embodiment of the present invention.

Please refer to FIG. 2, a method for producing a heat insulating material composed of an inorganic binder and aerogel according to a second embodiment of the present invention is shown, which comprises the following steps of: mixing step (S21), hydrolysis step (S22), condensation step (S23), composition step (S24), aging step (S25), and drying step (S26), thereby to produce a heat insulating blanket composed of a hydrophobic aerogel and inorganic fiber, a blanket composed of aerogel and organic fiber or a foam pad composed of aerogel and organic material, having the properties of high strength, without loose powder, resistant to low temperature and cold resisting.

Mixing step (S21): mixing one or a plurality of an alkoxysilane compound, an olefin alkoxysilane compound and R group-silicone oligo molecules or any mixture thereof with a small amount of inorganic binder solution, a small amount of halogen-ion-free surfactant and a mixing solvent together to form a mixing solution. The alkoxysilane compound is, such as, tetramethoxysilane (TMOS) or tetraethoxysilane (TEOS); the olefin alkoxysilane compound is, such as, methyltrimethoxysilane (MTMS) or methyltriethoxysilane (MTES); the R-silicone oligo molecules refer to, such as, polydimethylsiloxane (PDMS) or silicone precursor (DMDMS); wherein the R— is a functional group linked to a silicone molecular chain rear end, and comprises:

—COOH, —NH$_2$, —OH, —COH—COH, —N═C═O; and carbon number thereof is from C1 to C6. For calculation based on the total content of the mixing solution, the total content of alkoxysilane compound, olefin alkoxysilane compound and R-silicon oligo molecules is 3.0 mol % to 40.0 mol %, and the total content of the mixing solvent, inorganic binder solution and halogen-ion-free surfactant is 97.0 mol % to 60.0 mol %.

The mixing solvent used in the mixing step (S21) comprises one or a plurality of substances selected from a group consisting of the following: water, alcohols, aromatics, and alkanes. To be more specific, the alcohols can be, such as, ethanol; the aromatics can be, such as, toluene; the alkanes can be, such as, cyclohexane; the surfactant can be, such as, hexadecyl trimethyl ammonium halide. In the mixing step (S21), the alkoxysilane compound, olefin alkoxysilane compound or R-silicone oligo molecules is able to mix with the inorganic binder molecules. In addition, since the inorganic binder molecules is a metal oxide; therefore, the inorganic binder molecules in the mixing solution is able to dissociate into metal ions and acid ions or basic ions in the mixing solution. Furthermore, based on calculation of a total volume of the mixing solution, a concentration of the inorganic binder solution is 0.05 to 3.0 vol %.

In the mixing solution, the purpose of containing the surfactant is to reduce the phase separation behavior of the mixing solution. The surfactant comprises one or a plurality of compositions selected from a group consisting of the following: cationic surfactant, anionic surfactant, zwitterionic surfactant and nonionic surfactant. Moreover, based on calculation of a total volume of the mixing solution, a concentration of the surfactant is 0.005 to 0.5 vol %.

Hydrolysis step (S22): adding an acid catalyst into the mixing solution to perform a hydrolysis reaction. In addition, the content ratio of the acid catalyst relative to the acid ions generated from the dissociation of the inorganic binder and the total of the alkoxysilane compound, olefin alkoxysilane compound and the R-silicon oligo molecules is 0.0001:1 to 0.01:1. In addition, as the concentration of the acid ions is higher, the hydrolysis efficiency is higher. Nevertheless, the ion concentration can affect the dielectric property of the end product.

Condensation (S23): adding a basic catalyst into the mixing solution after hydrolysis in order to perform the condensation reaction. The basic catalyst solution used in the condensation step (S23) can be an aqueous solution or a mixing solution (such as: one of or a mixture of a plurality of water, secondary water, alcohols, aromatics, and alkanes) comprising hydrophilic solvent and hydrophobic solvent mixed together according to the process needs. The basic catalyst is able to promote the mixing solution to gradually generate phase separation and condensation. During the condensation process, the siloxane compound molecules and the inorganic binder molecules can undergo phase separation in the solution environment. The phase separation can cause the siloxane compound molecules and inorganic binder molecules to aggregate with each other to form aerogel initial particles of a particle size of several nanometers, following which the aerogel initial molecules of several nanometers then further stack and fuse with each other to form aerogel secondary particles of several hundred nanometers. Under such condition, the solution viscosity gradually increases to form a solution-like sol.

Composition step (S24): in the condensation step, when the mixing solution forms the solution-like sol, the solution-like sol is filled or immersed into an inorganic fiber blanket, an organic fiber blanket or an organic foam material quickly, allowing the solution-like sol to fill the inorganic fiber blanket, the organic fiber blanket or the organic foam material, followed by stationary placing the inorganic fiber blanket, the organic fiber blanket or the organic foam material filled with the solution-like sol, allowing the solution-like sol to condense gradually in the inorganic fiber blanket, the organic fiber blanket or the organic foam material in order to form a wet gel structure. The inorganic binder molecules in this step can be formed between the aerogel secondary particles and the fiber or foam material in order to act as a bonding medium; therefore, the internal structural force of the blanket composed of aerogel and inorganic fiber, blanket composed of aerogel and organic fiber or foam material composed of aerogel and organic material subsequently produced is strong; consequently, despite that the structure porosity of relevant products derived therefrom is high and density is low, it is not likely to have loose powder, and it is resistant to breakage and has a higher strength, thereby achieving excellent heat insulation property.

Aging step (S25): performing aging on the wet gel structure filled in the inorganic fiber blanket, organic fiber blanket or organic foam material in the composition step (S24) under a specific temperature in order to promote the wet gel structure to be more stable. For example, the aging temperature is, such as from 50° C. to 95° C., and preferably from 70° C. to 90° C.

Drying step (S26): after high-temperature distillation is used to remove the remaining liquid in the wet gel structure or filter is used to remove the remaining liquid, quick drying can be performed under the condition of temperature between 90 and 150° C. and under normal pressure, in order to obtain hydrophobic aerogel heat insulating material. Furthermore, a fluidized bed dryer, a constant temperature oven, a drum dryer, a mixing dryer, or a vacuum dryer at a temperature between 90 and 250° C. can be used to perform drying in order to accelerate the drying speed.

Accordingly, the first embodiment is able to produce a hydrophobic aerogel board or a hydrophobic aerogel block with high strength and without loose powder. In addition, the second embodiment utilizes the solution-like sol to bond with a large quantity of fiber blanket or foam material in order to produce a heat insulating blanket composed of aerogel and inorganic fiber, a heat insulating blanket composed of aerogel/organic fiber or a heat insulating pad composed of aerogel and foam material, thereby increasing the application property of the aerogel material. Particularly, it can be used as a low temperature cold resisting composite material or a low temperature aerogel heat insulating blanket, in order to increase the industrial value of the aerogel material.

Figure 3:
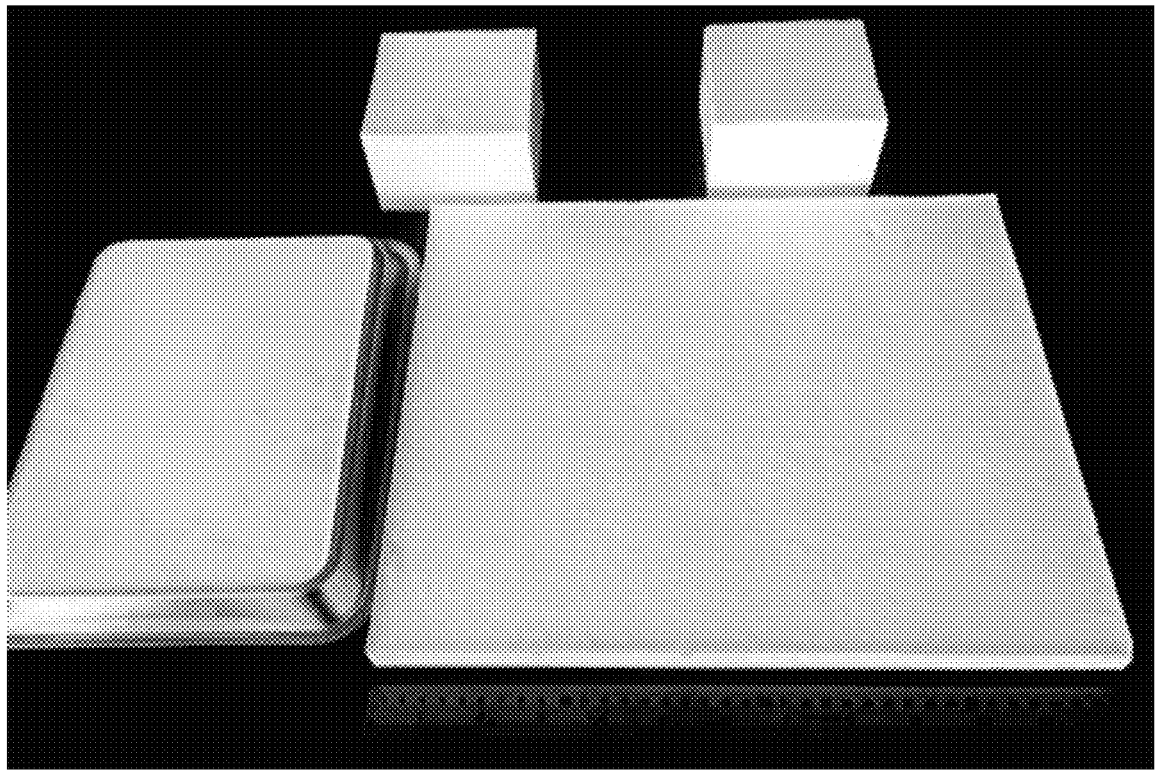
FIG. 3 is a photo image showing a hydrophobic aerogel heat insulating board and a heat insulating brick produced based on the method of the present invention.

Please refer to FIG. 3, a photo image taken by a conventional camera for different hydrophobic aerogel heat insulating boards and a heat insulating bricks produced is shown. The photo image taken illustrates that the method of the present invention is able to produce hydrophobic aerogel boards or bricks of different sizes or thicknesses.

Figure 4:
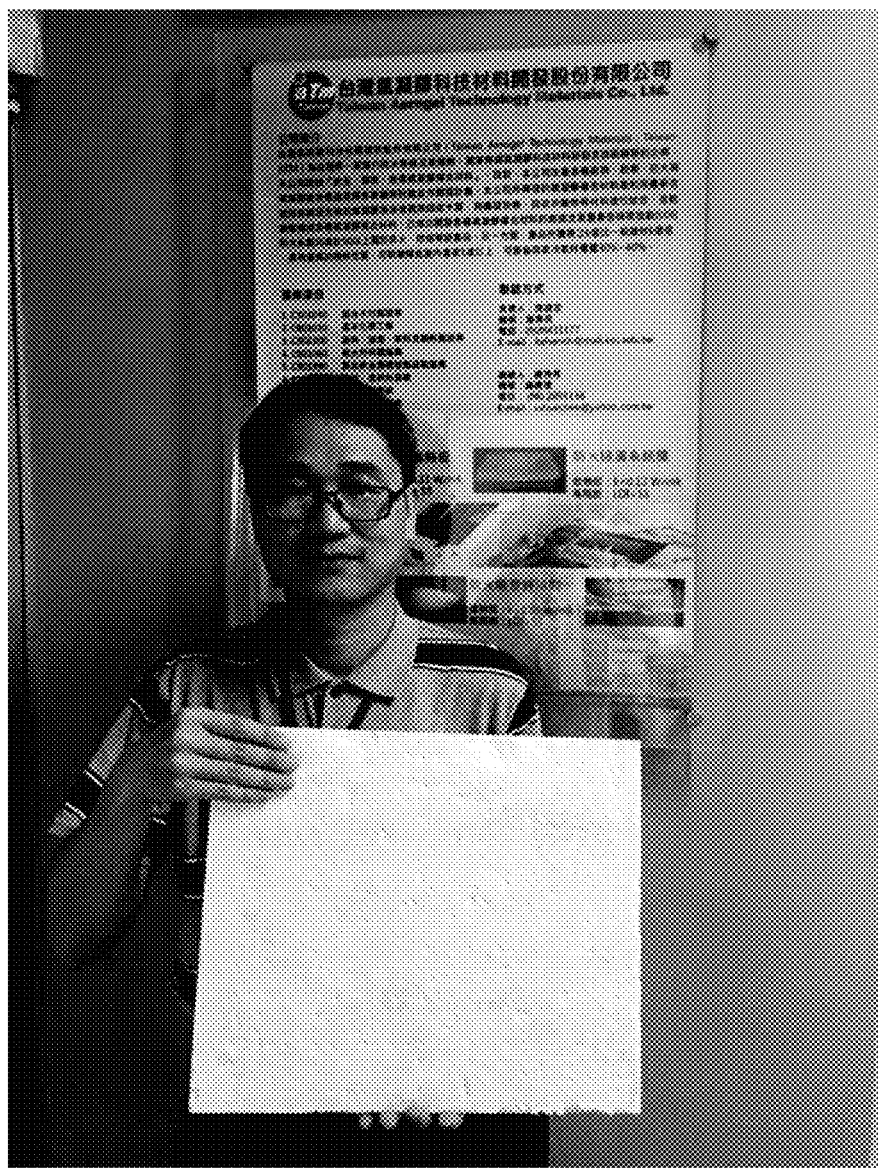
FIG. 4 is a photo image showing a heat insulating blanket composed of aerogel and inorganic fiber, a heat insulating blanket composed of aerogel and organic fiber, or a heat insulating pad composed of aerogel and organic fiber produced based on the method of the present invention.

Please refer to FIG. 4, a photo image taken by a conventional camera for different types of heat insulating blankets composed of aerogel and inorganic fiber, heat insulating blankets composed of aerogel and organic fiber, or heat insulating pads composed of aerogel and organic fiber produced is shown. The photo image taken illustrates that the heat insulating blankets composed of aerogel and inorganic fiber, heat insulating blankets composed of aerogel and organic fiber, or heat insulating pads composed of aerogel and organic fiber produced have an appropriate strength and a smooth surface.

Figure 5:
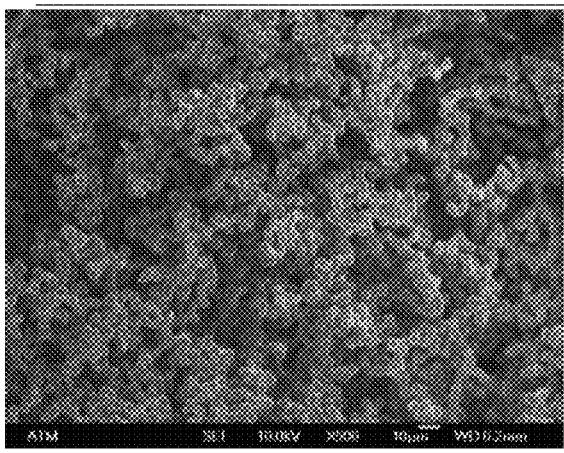
FIG. 5 is a scanning electronic microscope photo image for comparing the cross sections of a heat insulating material composed of inorganic binder and aerogel with a heat insulating blanket composed of inorganic binder, hydrophobic aerogel and inorganic fiber.
Figure 5:
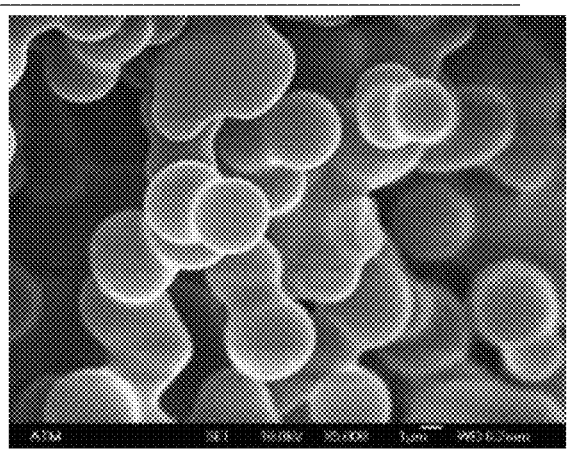
Figure 5:
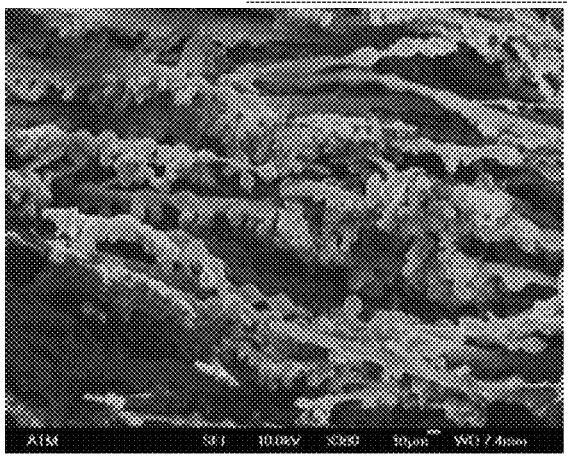
Figure 5:
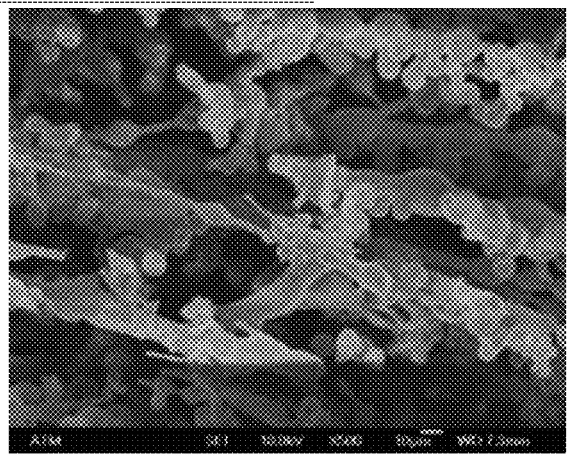

Please refer to FIG. 5, cross sections of a heat insulating material composed of inorganic binder and aerogel and a heat insulating blanket composed of inorganic binder, hydrophobic aerogel and inorganic fiber produced based on the method of the present invention are observed by a scanning electronic microscope. The scanning electronic microscope photo illustrates that since inorganic binder is added in this method, it is able to allow the microstructure of the heat insulating material composed of the hydrophobic aerogel produced has a network skeleton structure formed via the bonding of silicone particles of several micrometers, it also allows the surface microstructure to have a clear covering of inorganic binder film in order to provide the silicon particle aggregation strength. Furthermore, the photo image of the scanning electronic microscope also illustrates that in the microstructure of the heat insulating blanket composed of inorganic binder and hydrophobic aerogel and inorganic fiber, the hydrophobic aerogel of the inorganic binder clearly covers the fiber surface to form a thin film, and such aerogel film further bonds with other silicon particles, and a network skeleton structure of aerogel is formed between the fiber network, such that the bonding property between the fiber and the aerogel particles in the entire structure is excellent. As a result, during the application, it is not likely to have the problem of loose powder.

Figure 6:
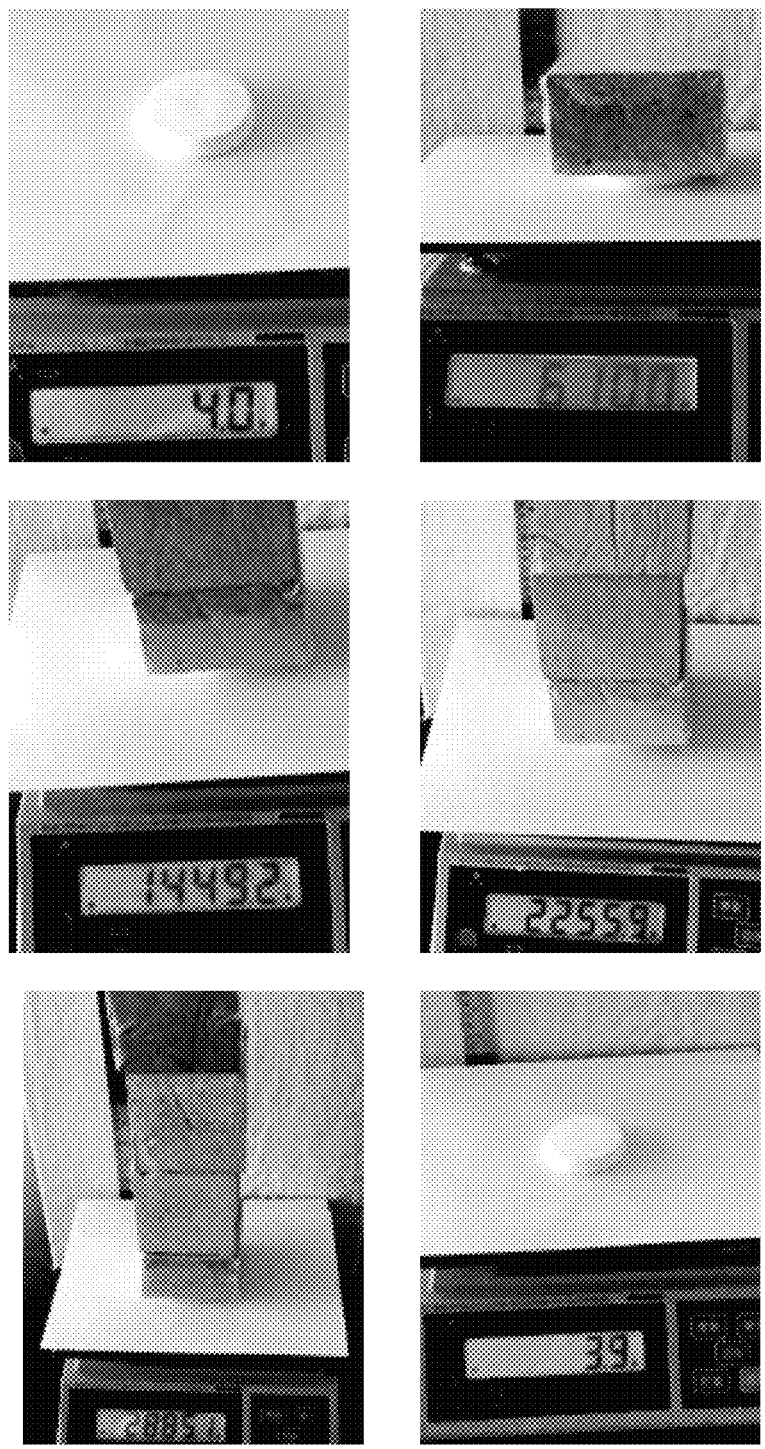
FIG. 6 is a photo image showing a heat insulating material composed of aerogel produced based on the method of the present invention, and illustrating its capability to withstand a load of a cement brick reaching the weight above 3000 g without breaking when the material has a volume of 30 mL and weight of 3.3 g.

Please refer to FIG. 6, the load bearing capacity of the heat insulating material composed of inorganic binder and aerogel produced based on the method of the present invention is illustrated. Form the photo image, it shows that when the volumes is 30 ml and weight is 4.0 g, it is able to withstand a heavy object of a total weight of nearly 2885 g to be placed thereon. In addition, after an additional loading of weight, it still shows no cracks, demonstrating that the heat insulating material composed of inorganic binder and aerogel produced based on the method of the present invention has an excellent load bearing characteristic.

Figure 7:
FIG. 7 is a photo image showing a heat insulating brick composed of inorganic binder and aerogel produced based on the method of the present invention, and illustrating its weight under the volume of 10.5 cm×10.5 cm×9.5 cm.

Please refer to FIG. 7, it is shown that when a heat insulating brick composed of inorganic binder and aerogel produced based on the method of the present invention has a volume of 10.5 cm×10.5 cm×9.5 cm, its weight is 153.4 g. After calculation, it can be obtained that the density of the heat-insulating material composed of inorganic binder and aerogel is 0.146 g/cm$^3$, demonstrating that it has an excellent light-weight effect.

Figure 8:
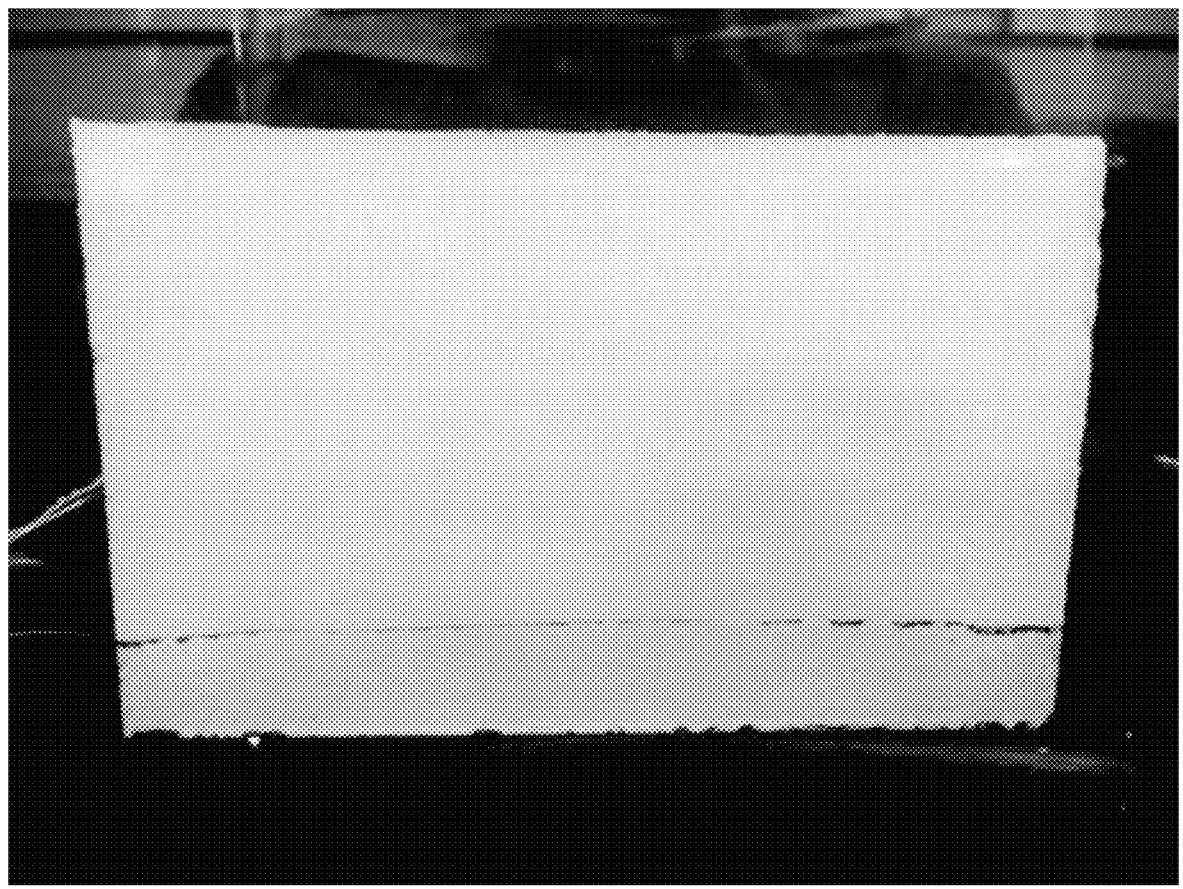
FIG. 8 is a photo image showing the heat insulating brick composed of inorganic binder and aerogel produced based on the method of the present invention floating on water.

Please refer to FIG. 8, a photo image of a heat insulating brick composed of inorganic binder and aerogel produced based on the method of the present invention is shown. Form the photo image, it shows that the heat insulating brick composed of inorganic binder and aerogel has a volume of approximately 85% above the water, and it is completely water repellent, demonstrating that it is of excellent property of water repellent and has a low density.

In view of the descriptions of the aforementioned embodiments, the manufacturing, application and technical effects of the present invention can be sufficiently understood. However, it shall be noted that the aforementioned embodiments refer to the preferred embodiments of the present invention only such that they shall not be used to limit the scope of the present invention, i.e. All simple equivalent changes and modifications made based on the claims and the content of the description of the present invention shall be considered to be within the scope of the present invention.

What is claimed is:

1. A method for producing a heat insulating material composed of a hydrophobic aerogel, comprising:

(1) mixing step: adding a siloxane compound, an inorganic binder solution and a chloride-ion free surfactant into a mixing solvent in order to be dispersed in the mixing solvent to form a uniform mixing solution; wherein based on total volume of the mixing solution, a concentration of the inorganic binder solution is 0.05 to 3.0 vol %, and a concentration of the chloride-ion free surfactant is 0.01 to 0.5 vol %; wherein the inorganic binder comprises: zirconium phosphate, phosphoric acid-copper oxide, or copper-containing oxide;

(2) hydrolysis step: adding an acid catalyst solution into the mixing solution to perform a hydrolysis reaction;

(3) condensation step: adding a basic catalyst solution into the mixing solution after the hydrolysis to perform a condensation reaction; wherein the siloxane compound forms stable hydrogel starting particles of a particle size of approximately 5 to 10 nanometers, followed by bonding with each other to grow to hydrogel secondary particles of a particle size of 100 to 1000 nanometers, thereby causing a viscosity of the mixing solution to increase in order to form a solution-like sol; finally, the hydrogel secondary particles form a wet gel of a network structure;

(4) aging step: performing aging on the wet gel of the network structure under a specific temperature range of 50 to 95° C. in order to form a more stable gel structure; and (5) drying step: under a normal pressure performing evaporation and drying on the gel structure to remove the solvent; during the drying step, water molecules in the gel structure is allowed to escape slowly under an environment of approximately 50 to 90° C., followed by performing drying under a high temperature of 90 to 150° C., in order to obtain an insulating material composed of a hydrophobic aerogel;

wherein the method does not include a solvent replacement step and a water washing step.

2. The method for producing a heat insulating material composed of a hydrophobic aerogel according to claim 1, wherein the siloxane compound comprises one or a plurality of substances selected from a group consisting of the following: alkoxysilane compound, methyltrimethoxysilane (MTMS), methyltriethoxysilane (MTES) and R-silicone oligo molecules; the alkoxysilane compound is tetramethoxysilane (TMOS) or tetraethoxysilane (TEOS); wherein the R— in the R-silicone oligo molecules is a functional group linked to a silicone molecular chain rear end, and the R— comprises: —NH$_2$, —OH, —COH—COH, —COOH, or —N=C=O.

3. The method for producing a heat insulating material composed of a hydrophobic aerogel according to claim 1, wherein the mixing solvent is a substance selected from a group consisting of the following: water, conditioned water, deionized water, ethanol, toluene, n-hexane, and cyclohexane.

4. The method for producing a heat insulating material composed of a hydrophobic aerogel according to claim 1, wherein the inorganic binder further comprises: aluminum-containing oxide or zirconium-containing oxide.

5. The method for producing a heat insulating material composed of a hydrophobic aerogel according to claim 1, wherein the chloride-ion free surfactant comprises one or a plurality of compositions selected from a group consisting of the following: cationic surfactant, anionic surfactant, and zwitterionic surfactant.

6. The method for producing a heat insulating material composed of a hydrophobic aerogel according to claim 1, wherein the chloride-ion free surfactant comprises nonionic surfactant.

7. The method for producing a heat insulating material composed of a hydrophobic aerogel according to claim 1, wherein the temperature of the aging step is 70 to 90° C.

8. The method for producing a heat insulating material composed of a hydrophobic aerogel according to claim 1, wherein in the condensation step, when the mixing solution becomes the solution-like sol, the solution-like sol is filled or immersed into an inorganic fiber blanket, an organic fiber blanket or an organic foam material, allowing the solution-like sol to fill the inorganic fiber blanket, the organic fiber blanket or the organic foam material, followed by stationary placing the inorganic fiber blanket, the organic fiber blanket or the organic foam material filled with the solution-like sol, allowing hydrogel secondary particles in the solution-like sol to condense gradually in the inorganic fiber blanket, the organic fiber blanket or the organic foam material in order to form the wet gel.

9. The method for producing a heat insulating material composed of a hydrophobic aerogel according to claim 8, wherein the inorganic fiber blanket comprises one or a plurality of materials selected from a group consisting of the following: ceramic fiber, glass fiber, carbon fiber, oxidized fiber and rockwool fiber; the organic fiber blanket or the organic foam material comprises one or a plurality of materials selected from a group consisting of the following: polypropylene, polyester, polyamide, polyamide-ester, polyurethane, polyurea and melamine.

10. The method for producing a heat insulating material composed of a hydrophobic aerogel according to claim 8, wherein the siloxane compound comprises one or a plurality of substances selected from a group consisting of the following: alkoxysilane compound, methyltrimethoxysilane (MTMS), methyltriethoxysilane (MTES) and R-silicone oligo molecules; the alkoxysilane compound is tetramethoxysilane (TMOS) or tetraethoxysilane (TEOS); the R-silicone oligo molecules comprise: polydimethylsiloxane (PDMS); wherein the R— in the R-silicone oligo molecules is a functional group linked to a silicone molecular chain rear end, and the R— comprises: —$NH_2$, —OH, —COH—COH, —COOH, or —N=C=O.

11. The method for producing a heat insulating material composed of a hydrophobic aerogel according to claim 8, wherein the mixing solvent is a substance selected from a group consisting of the following: water, conditioned water, deionized water, ethanol, toluene, n-hexane, and cyclohexane.

12. The method for producing a heat insulating material composed of a hydrophobic aerogel according to claim 8, wherein the inorganic binder further comprises: aluminum-containing oxide or zirconium-containing oxide.

13. The method for producing a heat insulating material composed of a hydrophobic aerogel according to claim 8, wherein the chloride-ion free surfactant comprises one or a plurality of compositions selected from a group consisting of the following: cationic surfactant, anionic surfactant, and zwitterionic surfactant.

14. The method for producing a heat insulating material composed of a hydrophobic aerogel according to claim 8, wherein the chloride-ion free surfactant comprises nonionic surfactant.

15. The method for producing a heat insulating material composed of a hydrophobic aerogel according to claim 8, wherein the temperature of the aging step is 70 to 90° C.

* * * * *